Patented Aug. 12, 1952

2,606,566

UNITED STATES PATENT OFFICE 2,606,566

TREATMENT OF FILMS WITH LIQUID

Milton S. Tarnopol, Brackenridge, Pa., assignor to Pittsburgh Plate Glass Company, Allegheny County, Pa., a corporation of Pennsylvania No Drawing. Application January 28, 1948, Serial No. 4,929

8 Claims. (Cl. 134—4)

This invention is related to novel methods of removing or decomposing (partially or completely) conductive metal oxide coatings, particularly transparent conductive metal oxide coatings which are formed or deposited upon glass or other refractory bases by exposing the glass or refractory base while in a highly heated condition to the action of a tin salt such as tin tetrachloride or its pentahydrate. As described in U. S. Patent 2,118,795, granted to Jesse T. Littleton, May 24, 1938, it is known to deposit films upon glass and similar bases by heating the glass or similar base to a temperature of about 600 to 750° C. and spraying the heated base with an aqueous solution of tin tetrachloride. According to applications Serial Number 762,659 and Serial Number 762,658, both filed July 22, 1947 by William O. Lytle, films which have improved and markedly superior electroconductivity may be obtained by spraying the plate or window glass or other glass while heated at a temperature of above 800° F. but below the temperature at which the glass becomes molten, with tin tetrachloride in aqueous solution or in vapor state in the presence of an agent such as methanol, phenyl hydrazine hydrochloride, or other agent such as will be listed hereinafter. The films thus obtained are of unknown composition but appear to contain a preponderant amount of the order of 97 to 99% or more of a tin oxide and certain impurities including carbon, silicon, sodium and chlorine. These films have a thickness of about 50 to 800 millimicrons, are transparent and have the unusual characteristic of being electroconductive, the particular degree of electroconductivity being dependent to a large degree upon the nature of the process of depositing the films. The electroconductivity of these films appears to be due to the presence of elemental tin atoms which are entrapped in the tin oxide lattice. Tin oxide films which are deposited in accordance with the processes described and claimed in the aforesaid applications of W. O. Lytle, have a resistance below about 500 ohms per unit square, a specific resistance below about 0.003 to 0.005 ohm centimeter, and a haze factor below about 2.5%. Further details respecting the production of these films will be found in the above identified applications.

Quite frequently, it is found desirable to remove the conductive transparent coating after it has been deposited. This is particularly desirable where it has been found advantageous to have the transparent coating upon only a portion of a glass or other refractory sheet. For example, it is frequently advantageous to provide a sheet with individual strips of the transparent electroconductive coatings which are separated by non-conducting areas or essentially non-conducting areas. Due to the conditions of operation, it has been found inexpedient to attempt to localize deposition of the conductive film. Consequently, it is more advantageous to deposit a film upon a refractory such as a glass sheet and thereafter to destroy the conductivity of the coating in localized areas. Furthermore, it is occasionally desirable to destroy the electroconductivity upon a coated sheet where the coating on the sheet is defective in order that the sheet may be reprocessed or may be used for other purposes.

The problem of removing the coating and/or reducing the electroconductivity of the coated surface has been complicated by the fact that alkalies cannot be used due to the tendency of the alkali to attack the glass base and thereby impair its visibility and has been further complicated by the fact that acids do not destroy the electroconductivity of the coating with satisfactory speed.

In accordance with the present invention, a novel method has been provided whereby the refractory base having an electroconductive transparent tin oxide containing film may be treated to destroy or reduce the electroconductivity and/or to remove the coating in localized areas or over the entire coated area. According to this process, the glass or other refractory base having the transparent electroconductive coating is subjected to the action of an acid and a metal more electro-positive than tin. Typical electropositive metals for this purpose include zinc, cadmium, aluminum, and iron. This process may be carried out very effectively by depositing upon the coated base a coating of finely divided or pulverulent electro-negative metal, such as zinc together with a dispersing agent, and a water dispersible binder which serves as binding medium to hold the zinc on the base. Thereafter, the zinc coated base may be sprayed or otherwise coated with an aqueous solution of an acid, preferably a nonoxidizing acid which is relatively strong (ionization constant for the first hydrogen above 1 times $10^{-3}$ or above 5 percent ionized) such as hydrochloric acid, hydrobromic acid, sulfuric acid, phosphoric, phosphorous or sulphorous, trichloroacetic, or other mineral acid or equivalent acid which does not readily etch glass and in which the anion thereof is essentially non-oxidizing in character. Oxidizing acids such as nitric acid or chromic acid generally are found to be unsuitable.

A typical solution for applying the zinc or other electro-positive metal to the base to be treated may be prepared in the following manner. A solution of the following composition may be prepared:

3500 cubic centimeters water
50 cubic centimeters glycerol
10 grams sodium nitrite
5 grams sodium pyrophosphate
25 grams bentonite This solution may be mixed in equal parts by volume with methanol and one pound of powdered zinc is then added per quart of the resulting methanol solution. The solution thus obtained is then sprayed upon the glass article to deposit a thin zinc-containing film upon the surface thereof and thereafter the zinc coated surface is sprayed with an aqueous solution of an acid such as concentrated aqueous hydrochloric acid having an HCl concentration of about 20 to 40 percent by weight, the amount of the HCl solution being sufficient to thoroughly wet the zinc-coated surface. Following this operation, the sheet is allowed to stand for a short period of time for example 5 or 10 minutes and is then washed with water to remove the remaining acid and other coating components. Upon such washing, it will be found that the electroconductivity of the surface which has been exposed to the above treatment has been destroyed and the electroconductive film has been removed.

The process is capable of a number of variations. For example other metals including finely divided cadmium, finely divided aluminum and other finely divided metals which are more electro-positive than tin (the alkali metals being regarded as most electro-positive and gold and silver most electro-negative in the electro-motive series). Furthermore other water dispersible binders may be used in lieu of bentonite such as other equivalent clays. In addition other acids such as aqueous solutions of sulfuric acid and other acids which will dissolve metals without reduction or decomposition of the anion of the acid may be used in lieu of the hydrochloric acid solution. In selecting such acids, it is desirable to use acid solutions which are relatively inert to the glass base itself in order to avoid etching of the surface thereof. The concentration of acids used normally is within the range of 1 to 40 percent by weight of the solution although other solutions could be used.

The process also may be conducted in other ways. For example powdered zinc may simply be sprinkled over the glass base to be treated and aqueous acid poured over the zinc coated base. Thereupon the coating is removed simply by rubbing the wetted surface with a sponge and washing the acid and removed coating off the glass. Furthermore, the base may be coated with the acid solution and rubbed with a block or pencil of zinc or equivalent metal. Other methods whereby the tin oxide coating is contacted simultaneously with the electro-negative metal and the aqueous acid may be used according to this invention. After the film has been removed to the desired degree, the glass is washed with water to remove the acid and the zinc therefrom.

As previously stated, it frequently is desirable to effect only a partial removal of the electroconductive coating so that the glass base will have an electroconductive coating deposited thereupon in localized areas for example in separate individual stripes extending across the glass sheet or in the form of isolated dots of electroconductive coating on the surface of the sheet. In such a case, the glass sheet to be treated may be coated with a suitable resistance material which will resist the attack of the acid and metal at such portions where removal of the coating is not desired. Alternatively the acid and zinc or similar metal may be applied only in localized areas. According to a further embodiment relatively thick films may be made thinner by briefly applying the acid and the metal to the film surface and removing the acid by washing with water before complete decomposition of the conductive film is effected.

The films which are to be removed according to this invention are produced by application of various tin compounds to a glass base which is heated above about 600 to 800° F. but below the temperature at which the glass becomes molten. Where products of optimum conductivity are desired, it has been found advantageous to deposit the tin compound in the presence of a reducing agent such as methanol, phenyl hydrazine, antimony chloride and numerous others. In the production of the coated product, the glass base is heated for several minutes at a temperature above 600 to 800° F. for example 1050° F., and the glass base is then removed from the furnace and sprayed with an aqueous solution of tin tetrachloride. This spraying operation requires but a few seconds, usually 5 to 10 seconds, and thereafter the treated sheet is allowed to cool. The film thus obtained is transparent and has the conductivity specified and normally has a thickness of 50 to 800 millimicrons. Thicker films for example those above 1500 millimicrons in thickness normally are opaque.

A typical process of producing the tin oxide films which are to be treated according to this invention is set forth in the following examples:

*Example I*

Using a solution containing 100 parts by weight of fused $SnCl_4.5H_2O$, 10 parts by weight $H_2O$ and 2.5 parts by weight phenyl hydrazine hydrochloride, 5 milliliters of the solution is introduced through a thistle tube into an atomizer of the spray gun type connected to an outlet supplying air under 50 pounds per square inch pressure. A glass plate 5/64 inch in thickness and six inches square is placed on a rack having an inclined support which in turn rests on a conveyor. The plate is heated at 1150° F. in an electric furnace for two minutes, fifteen seconds, being then quickly withdrawn and immediately sprayed with the entire contents of the thistle tube, the spraying requiring a trifle less than three seconds. The distance from the spray nozzle to the plate is kept constant at a value between one and two feet. After spraying entire area of the plate it is allowed to cool in air until it can be handled after which it is washed with distilled water and polished with a dry cloth. The average resistivity of six plates coated under conditions identical to those above is 371 ohms per square unit of surface area and the average haze precentage measured by the A. S. T. M. method described above is 1.3.

When plates are coated with more than one application of the coating fluid containing phenylhydrazine hydrochloride or another equivalent reducing agent, the conductivity of the film is further diminished considerably while the average haze percentage is not increased to an objectionable point. For instance, when two coatings of 5 milliliters each were applied to plates in the manner described above in connection with Example I the average resistivity of the plates was reduced to 132 ohms per square unit of surface area while the average haze percentage increased only 2.1.

*Example II*

An aqueous solution comprising 4 grams of stannous acetate, 30 milliliters of methanol and enough 12N (37%) aqueous HCl to cause the stannous acetate to dissolve was prepared. This solution was allowed to stand or age in air overnight. 5 milliliters of the aged solution was sprayed in five seconds from an atomizing nozzle at an air pressure of 30 p. s. i. and the spray directed against a glass sheet 8 inches by 4 inches by 7/64 inch which had been subjected to a furnace temperature of 1250° F. for 2¼ minutes. Upon removal of surface powder by brushing the treated sheet after cooling, a very clear adherent essentially colorless coating was found to be present on the glass. This coating was approximately 50 to 75 millimicrons in thickness. Its conductivity was 650 to 700 ohms per unit square.

Although the invention is particularly directed to the removal or partial removal of transparent electroconductive coatings from glass bases having such coatings, the invention is applicable to use in connection with the removal of coatings from various refractory base materials having transparent electroconductive tin or tin oxide containing coatings, for example the invention may be applied to the treatment of certain coated glasses including coated lime soda glass (window or plate glass), or coated borosilicate glass or coated quartz, porcelain, china, mica, stone, silicon carbide, tungsten carbide, aluminum oxide, glass fiber, phosphate glass, and other refractories of this character.

Although the present invention has been described with reference to the specific details of certain embodiments thereof, it is not intended that such details shall be regarded as limitations upon the scope of the invention except insofar as included in the accompanying claims.

What is claimed:

1. A method of reducing the electroconductivity of a glass base having a transparent electroconductive tin oxide coating thereon which comprises depositing upon the tin oxide coating, a coating of a mixture comprising a metal more electro-positive than tin in pulverulent form and a water dispersible binder and thereafter applying to the metal coated base an aqueous non-oxidizing acid.

2. The process of claim 1 wherein the electronegative metal is zinc.

3. The method of claim 1 wherein the acid is hydrochloric acid.

4. A method of reducing the electroconductivity of a refractory base having a transparent electroconductive tin oxide coating thereon which comprises depositing pulverulent zinc upon the coated base and in contact with the coating and thereafter applying to the zinc an aqueous non-oxidizing acid.

5. The method of claim 4 wherein the non-oxidizing acid is hydrochloric acid.

6. A method of reducing the electroconductivity of a transparent refractory base having a transparent electroconductive tin oxide coating thereon, which comprises depositing a pulverulent metal more electro-positive than tin upon the coated base and in contact with the coating and thereafter applying to the metal an aqueous non-oxidizing acid.

7. A method of treating a refractory base having a transparent electroconductive coating of tin oxide thereon, which comprises applying a metal more electro-positive than tin, into contact with the tin oxide coating and subjecting the coated base to the action of a non-oxidizing acid while said contact is maintained.

8. The process of claim 7 wherein the metal is zinc.

MILTON S. TARNOPOL.

REFERENCES CITED

The following references are of record in the file of this patent:

UNITED STATES PATENTS

| Number | Name | Date |
|---|---|---|
| 221,022 | Beck et al. | Oct. 28, 1879 |
| 1,430,844 | Payne | Oct. 3, 1922 |

OTHER REFERENCES

Hackh, "Chemical Dictionary," third edition, 1944, page 283, Blackiston, Philadelphia. (Copy in Patent Office Scientific Library.)

"Handbook of Chemistry and Physics," 28th edition, page 1521, Chem. Rubber Co., Cleveland, Ohio. (Copy in Patent Office Scientific Library.)